W. L. ABATE.
AIR CYLINDER.
APPLICATION FILED MAR. 20, 1909.
949,872.
Patented Feb. 22, 1910.
6 SHEETS—SHEET 1.
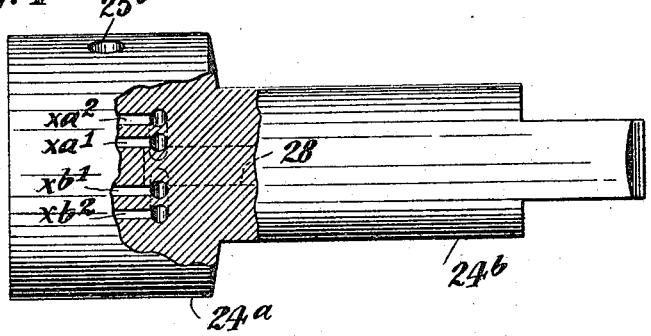
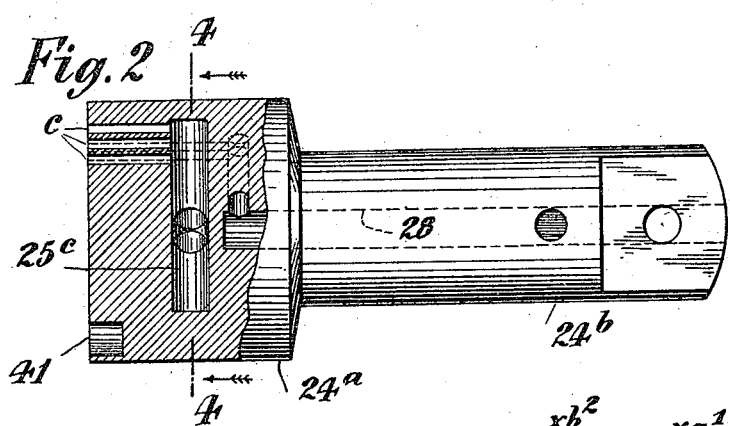
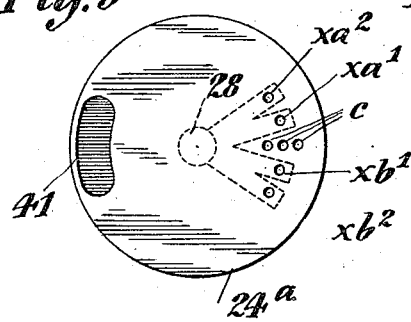
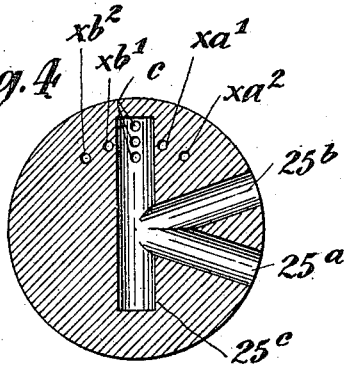
Witnesses:
M. A. Helenke
V. M. Braun
Walter L. Abate, Inventor
by Schreiter & Mathews,
his Att'ys

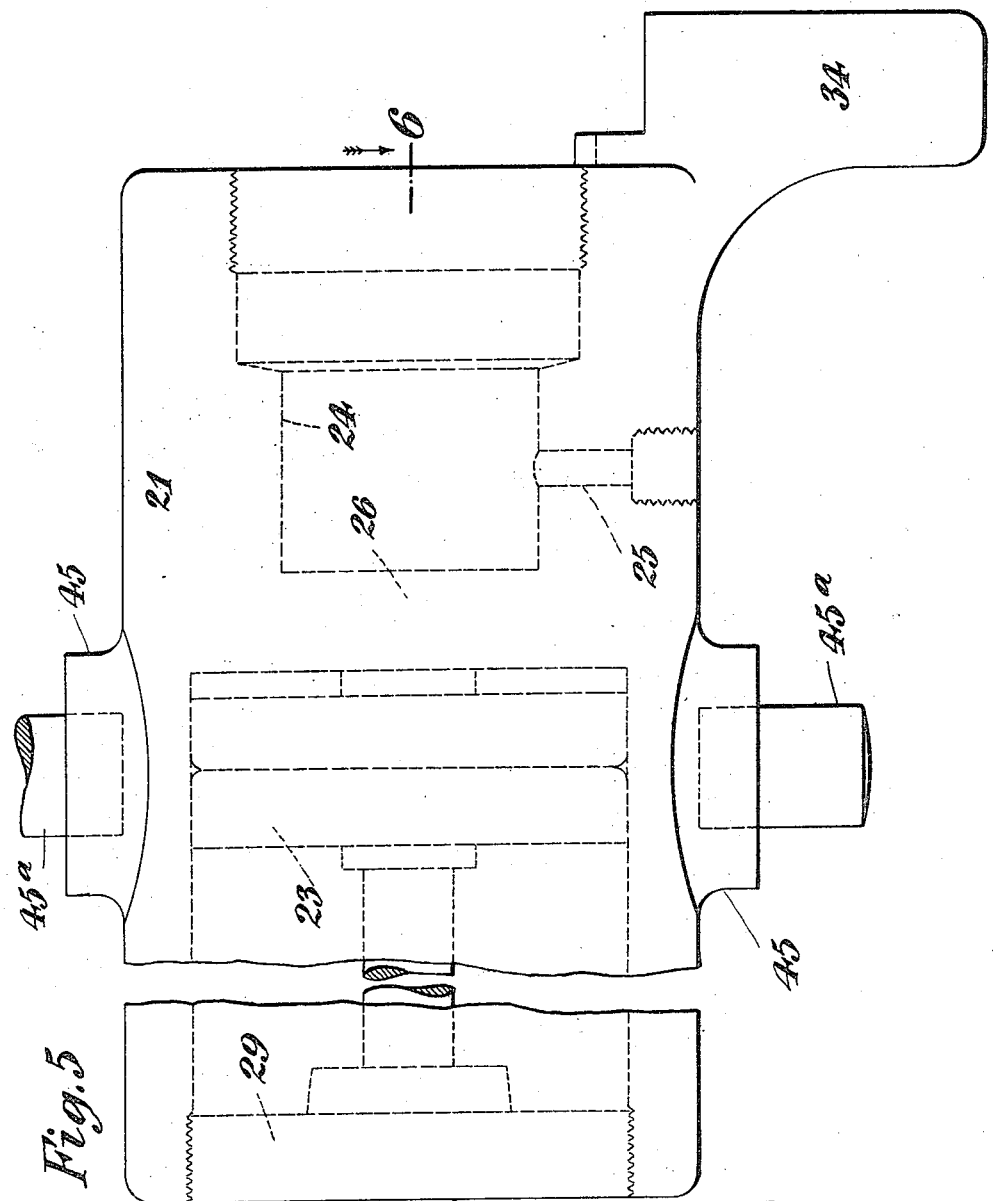

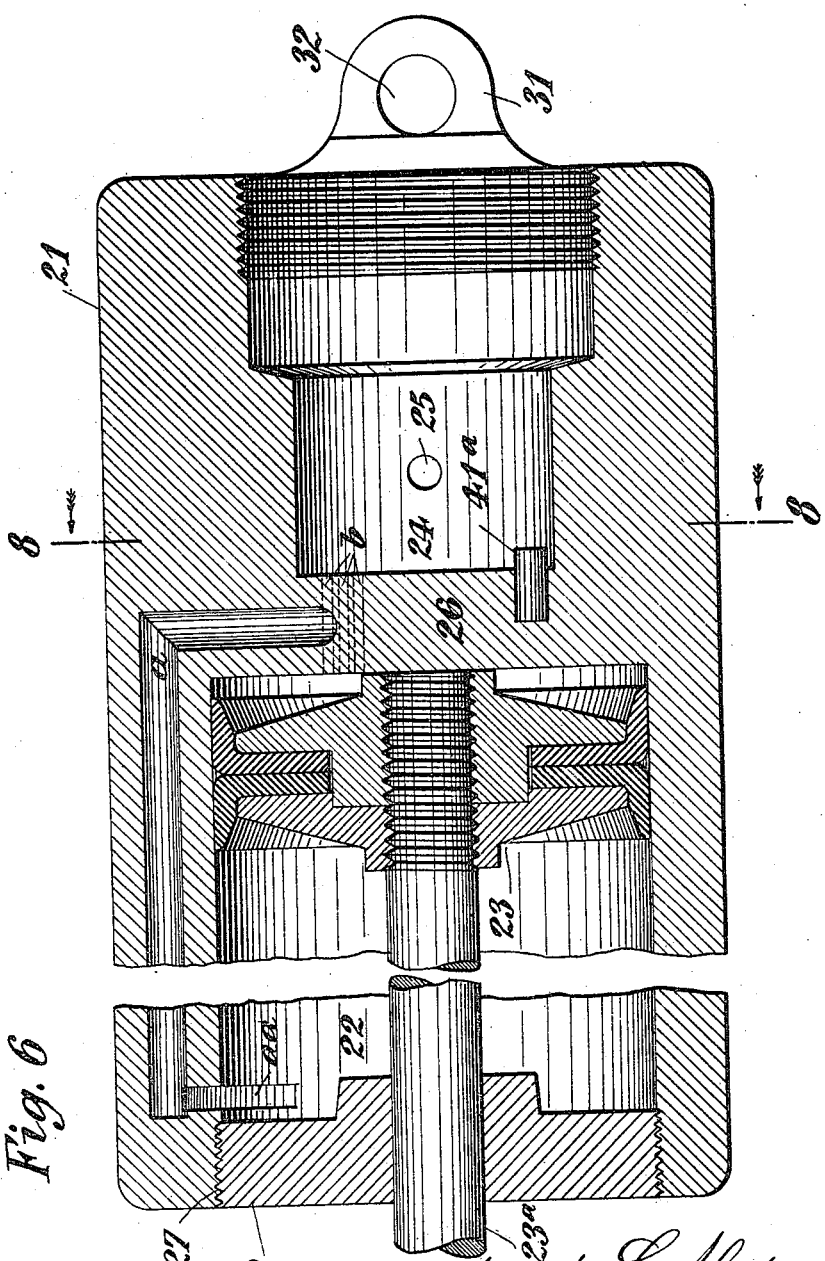

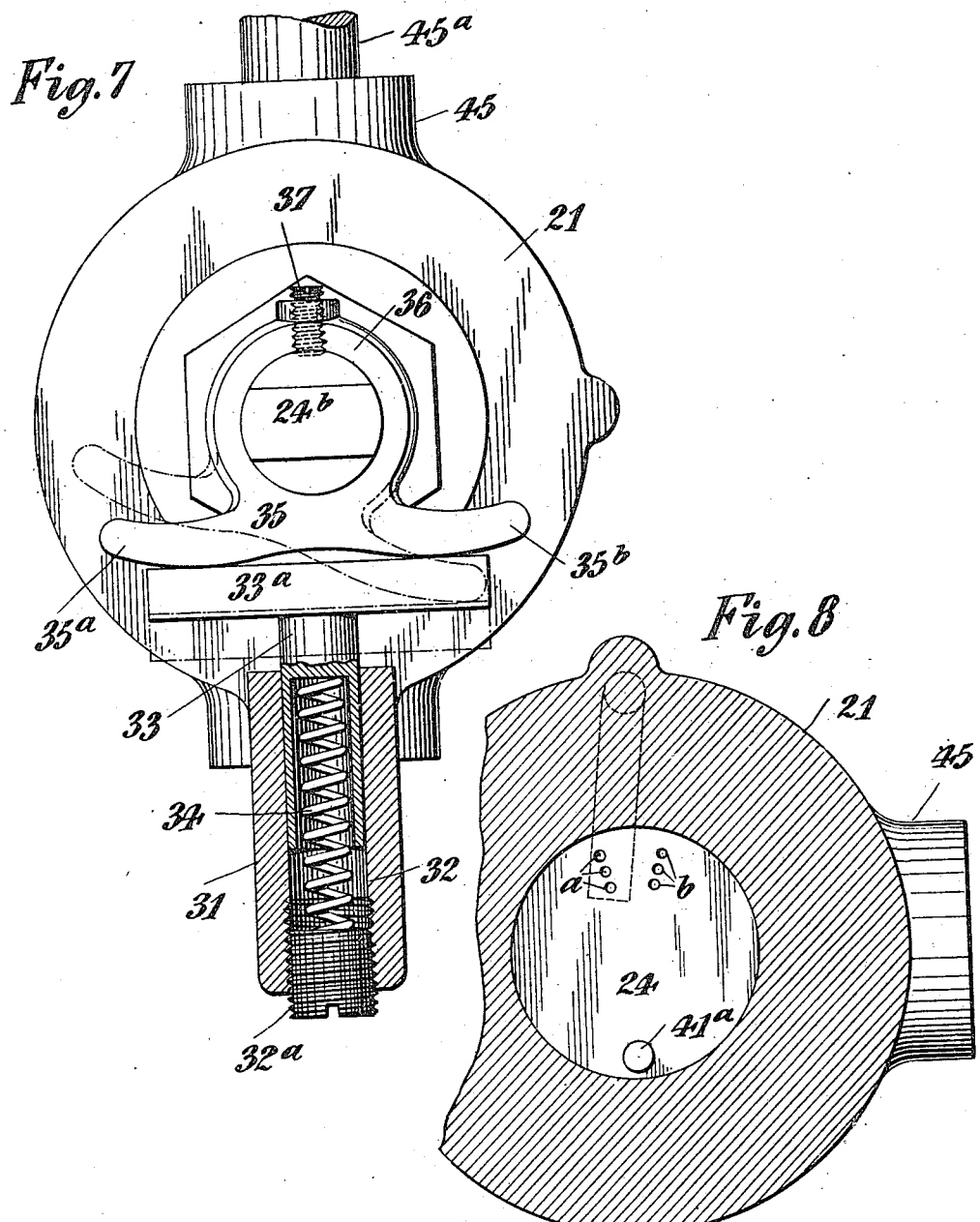

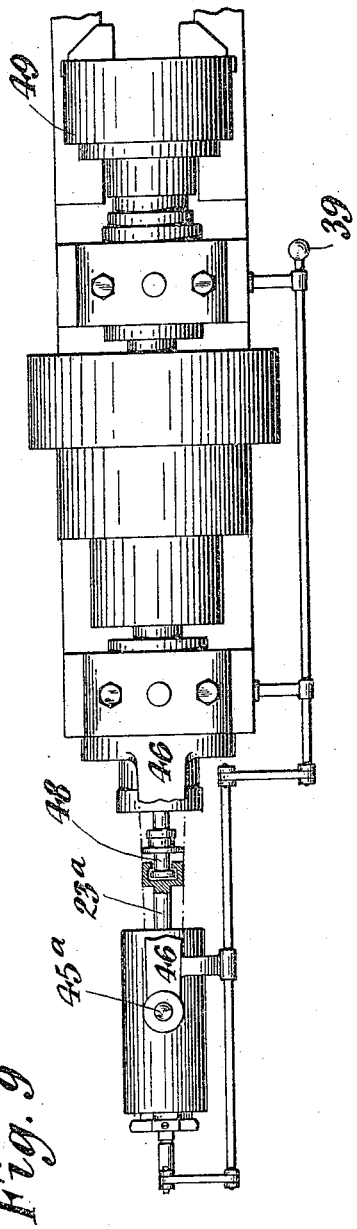

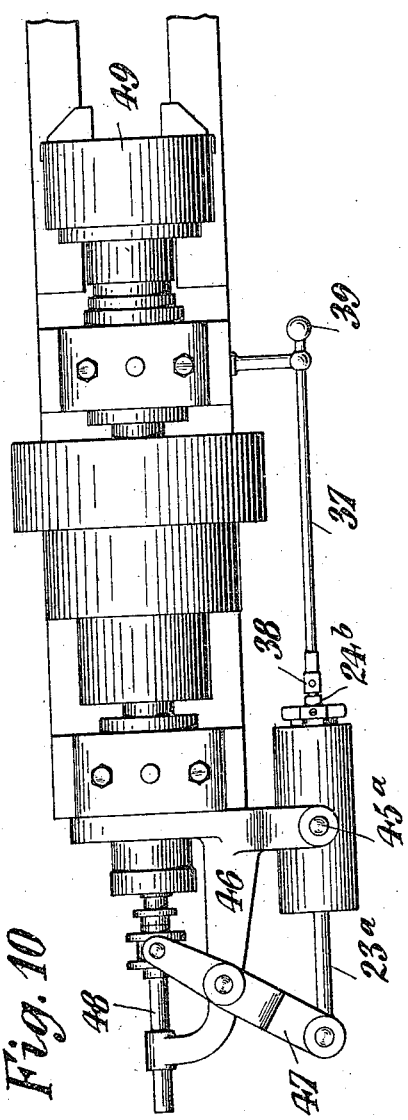
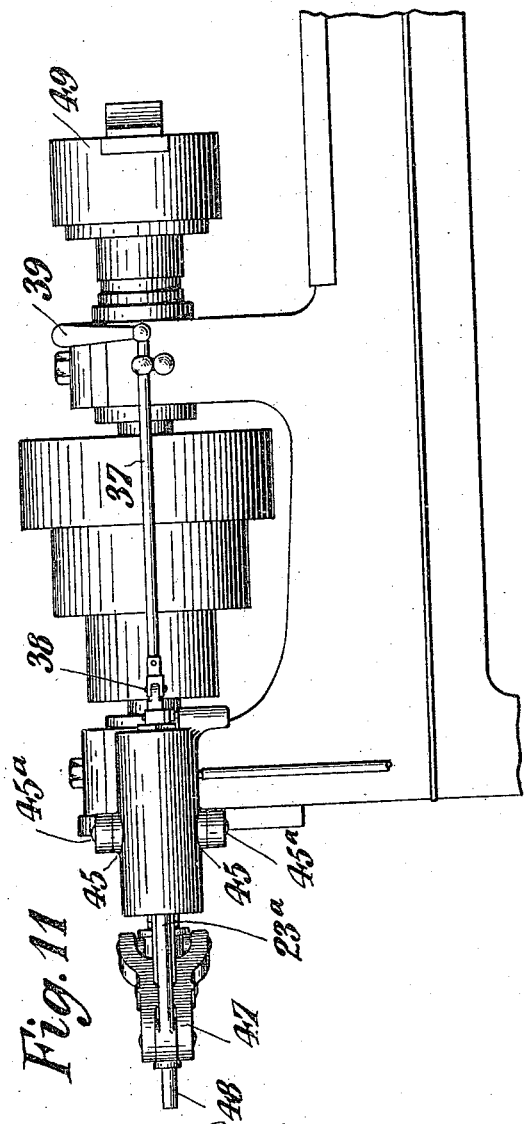

UNITED STATES PATENT OFFICE.

WALTER L. ABATE, OF MOUNT VERNON, NEW YORK.

AIR-CYLINDER.

949,872.  Specification of Letters Patent.  Patented Feb. 22, 1910.

Application filed March 20, 1909. Serial No. 484,761.

*To all whom it may concern:*

Be it known that I, WALTER L. ABATE, a citizen of the United States, and a resident of Mount Vernon, county of Westchester, and State of New York, have invented a certain new and useful improvement in devices for operating automatic chucks and other similar accessories of machine-tools by compressed air, generally known in the art as "air-cylinders," the following being a full, clear, and exact specification of my improved device, reference being had to the accompanying drawings, wherein—

Figure 1 is an elevation, partly sectional view, of the oscillating valve; Fig. 2 a similar view of the valve turned 90° from the position shown in Fig. 1; Fig. 3 is a left end view of the valve, in the position corresponding to that shown in Fig. 1, the set of exhaust ducts being indicated in dotted lines; Fig. 4 is a cross-sectional view of the valve on line 4—4, indicated in Fig. 2 looking to the left; Fig. 5 is an elevation of the air cylinder casing; the piston and the interior arrangement of the casing being indicated in dotted lines; Fig. 6 is a longitudinal sectional view of the air cylinder casing on lines 6—6 indicated in Fig. 5, and showing also the position at the start of its outward stroke; Fig. 7 is an end view (of the valve end) of the air cylinder in the same position as Fig. 5 completely assembled, but the shaft and handle for turning the valve being removed; in this figure the mechanism for automatically returning the valve to its normal position is shown partly in a sectional view; Fig. 8 a cross-sectional view thereof on lines 8—8 indicated in Fig. 6, looking to the left; Fig. 9 is a plan view of the head of a lathe with my improved air cylinder connected directly to the draw-rod of the chuck; Fig. 10 is a plan view showing my improved air cylinder mounted on a lathe and connected to the lever for operating the draw-rod of an automatic chuck; and Fig. 11 is a side elevation thereof.

My invention relates to pneumatic devices for operating tools and consists of the hereinafter described machine for operating chucks, and consists of the hereinafter described machine for operating chucks, clutches, belt shifters and the like, by compressed air. Devices of this nature, as heretofore were used, are constructed upon the principle of having the compressed air acting constantly upon the piston during the interval between reversing its stroke. As a result of that, there is being exerted constantly a considerable force upon the part of machinery operated by such device. This constant exertion of such force results in producing a great deal of friction in the parts of the tool operated by such devices, which friction must be overcome by the power operating the tool, and which power is utterly lost in overcoming the friction, and besides, the wear on the moving parts of such machine or tool, is greatly increased. My attention was directed to this defect by the fact that the parts of such machines have worn out very rapidly and had to be replaced. In some instances this friction increased so much as to absorb nearly the entire force supplied for driving the particular machinery.

While in some instances it is necessary, owing to the particular construction of the device, operated by the air cylinder, to keep the compressed air acting on the piston, there are clutches, chucks, etc., constructed in such manner that the maintaining of the pressure upon the piston in the air cylinder is not needed. As an instance of such an apparatus, the chuck shown and described in the U. S. Letters Patent to P. F. Krug, #803,604, of November 7, 1905, may be cited. In this chuck, the mechanism operating the jaws of the chuck is so constructed that the parts, moving the jaws, when acted upon to grip an object between the jaws, are brought in a locking position; that is to say, the grip of the jaws cannot be released except by application of positive force upon the draw-rod in a direction opposite to that in which it must be moved to close the jaws. There are other devices in use for various purposes in connection with machine tools and the like, in which it is also unnecessary to maintain the force effecting their motion in action, and my improved pneumatic machine for operating such devices is designed also with the object in view, to permit and to cause the pressure, acting upon the parts of the tools, to be released, and also with the object in view to cause this releasing of the pressure to be effected automatically by the action of the machine itself, immediately upon the completion of the stroke of the piston in the air cylinder. To this end, I have devised a system of ducts arranged in the casing of the cylinder, in the web, separating the valve seat from the piston chamber, and in the valve. These ducts are so arranged that when the valve is in its normal position of rest, there is a continuous open passage from the piston chamber, one from the space in front, and one from the space in the rear of the piston, to the exhaust port, while the inlet port of the cylinder is closed; whereas by turning the valve in one direction, the duct from one space of the piston chamber with the exhaust port is cut off, the inlet port is opened and connected with the duct to the other part of the piston chamber, to admit the compressed air into it; and again, by turning the valve in opposite direction, the duct from the inlet port to that part of the piston chamber is shut off and the duct between the inlet port and the other part of the piston chamber opened and connected. During the turn of the valve from its position, admitting the compressed air to one part of the piston chamber (for instance, in front of the piston) to its position effecting the connection of the inlet port, with the duct into the other part of the piston chamber (in the rear of the piston) the valve always passes through the position connecting both parts of the piston chamber with the exhaust port, and therefore, irrespectively how rapidly the changes in the position of the valve may be effected, the opening of the inlet port and connecting of the duct into one part of the piston chamber is always preceded by the opening and connecting of the exhaust port with the other part of the piston chamber, into which the piston is to be driven. The ducts and the connections are also so arranged that the exhaust port of the cylinder is kept in open communication with the part of the piston chamber, into which the piston is driven, while compressed air is being admitted in the other part.

Referring to the drawings, 21 is the casing of the cylinder, 22 is the chamber, wherein the piston 23 is reciprocated; 24 is the valve chamber or seat, and 25 is the inlet port for compressed air or other fluid as may be used for the operating of the device. Piston 23 is of the same construction as used in devices of this character. The piston rod $23^a$ projects through the head 29 of the cylinder and its end is arranged for coupling it to whatever apparatus is to be operated thereby. Suitable brackets or bosses may be cast on, on the casing 21 for affixing or supporting it in the required position upon the machine tool. One form of such an arrangement is shown in Fig. 9 and another in Fig. 10. These arrangements are made to suit the conditions of the use to which my improved device is put. The valve chamber 24 of the air cylinder is separated from the piston chamber 22 by the web 26, and is connected therewith by two series of ducts designated respectively $a$ and $b$ in the drawings. The series of ducts designated $a$ is composed of the L-shaped duct $a$ whose longer branch extends longitudinally for the entire length of the piston chamber 22 and opens into the piston chamber through grooves $a$ $a$ at or near the screw-threaded recess 27 for the head of the cylinder; the shorter arm of this duct extends through the web 26 on a line parallel to the walls thereof, but diverging to one side of the center thereof, and of a series of perforations (see Figs. 6 and 8) made transversely through that part of the web 26 between the short arm of the duct $a$ and the valve chamber 24. The series of ducts $b$ is made up of perforations drilled through the web 26 as shown in Figs. 6 and 8. The series of ducts $a$ constitute the communication between the valve chamber 24 and the part of the piston chamber 22 in the rear of the piston, whereas, the ducts $b$ connect the valve chamber with the part of the piston chamber in front of the piston.

The arrangement of the ducts in the valve $24^a$ is shown in Figs. 1, 2, 3 and 4; one set, controlling the admission of air to the apparatus, consists of the two branches $25^a$ and $25^b$ driven transversely through the valve on radial lines to the center thereof; the branch $25^c$, driven diametrically through the center of the valve, connecting with the branches $25^a$ and $25^b$ at the point of their junction in the center of the valve and of a series of perforations $c$ driven parallel to the axis of the valve $24^a$ from the duct $25^c$ to its face. These perforations $c$ are located one underneath the other on a line intersecting the center of the valve and their relative positions correspond exactly to the positions of the perforations $a$ and $b$ in the web 26 of the casing. The other set of ducts in the valve comprises the bore 28, driven longitudinally through the center of the stem $24^b$ and some distance into the head of valve $24^a$, where it connects with the radial perforations $x^{a2}$, $x^{a\prime}$, $x^{b\prime}$ and $x^{b2}$, driven transversely through the head of the valve (see Fig. 3) connecting in turn with the four perforations $x^{a2}$, $x^{a\prime}$, $x^{b\prime}$, and $x^{b2}$, driven longitudinally through the valve $24^a$ on lines parallel to the axis thereof and arranged relatively to each other on the arc of a circle, concentrical with the valve, and equi-distant, from the center of the valve, with the central perforation $c$ of the other set.

The ducts $a$ and $b$ within the casing of the cylinder, serve for both purposes, inlet and exhaust. During the normal position of the valve, both of them are connected with the exhaust port, and each of them is alternately connected with the inlet port and with the exhaust port by the turning of the valve. In the valve there is a separate set of inlet ducts and a separate set of exhaust ducts. The inlet duct comprises the branches $25^a$, $25^b$, $25^c$ and $c$. The exhaust duct comprises the branches 28, $x^{a2}$, $x^{a\prime}$, $x^{b\prime}$ and $x^{b2}$ arranged and connecting as above described. The arrangement of the two sets of ducts in the valve $24^a$ furnishes the means for the connecting of either duct $a$ or $b$ from the piston chamber with the inlet port 25, or with the exhaust port 28, of the cylinder, by a turn of the valve, and simultaneously for connecting of the other part of the piston chamber with the exhaust port. The double branching of the exhaust ducts in the valve furnishes the means, in connection with the other parts and arrangement of the ducts, for simultaneous connecting of both parts of the piston chamber with the exhaust port. Thus, by turning the valve in one direction, the compressed air, or other driving medium, is admitted into one part of the piston chamber (for instance, in the part in front of the piston) while the other part is placed in open communication with the exhaust port; and again, by turning the valve in opposite direction, the connections are reversed. The part of the piston chamber, into which the piston is to be driven, by admitting the compressed air in the other part, remains connected with the exhaust port during the entire time while the compressed air is being admitted into the other part. The alternate connections of the parts of the piston chamber, in front and in the rear of the piston, with the inlet port 25 and the exhaust port 28 are made as follows:—

When the valve $24^a$ is in its normal position of rest, each of the termini of the exhaust ducts $x^{a\prime}$ and $x^{b\prime}$ register with one of the ducts $a$ and $b$ (see Figs. 6 and 8), whereby whatever compressed air, or other driving fluid, may be contained in either portion of the piston chamber 22 of the cylinder, is permitted to escape. In this position the full surface of the valve, between the branches $25^a$ and $25^b$ of the air duct, stands against the inlet port 25 and thereby holds it closed. By turning the valve in the direction of the hands of a clock, that is, from left to right, the orifices or ports of the branch $c$ of the duct $25^c$ in the valve are brought in position to register with the orifices or ports of the duct $b$, connecting directly, through the web 26, the valve chamber 24 with the space of the piston chamber 22 in front of the piston 23. Simultaneously, the branch $25^a$ of the air duct is brought in position directly opposite to the inlet port 25; thus the connection from the inlet port into that part of the piston chamber is made. The orifices of the ducts $x^{b\prime}$ and $x^{b2}$ are also shifted; they stand then against the full face of the web 26, and the orifice of the branch $x^{a2}$ is moved in the position where the orifice $x^{a\prime}$ was, the latter having been shifted, simultaneously and equidistantly, to the right. The radial branches $x^{a\prime}$, $x^{a2}$, $x^{b\prime}$ and $x^{b2}$ of the exhaust duct, are joined together, and therefore, when the orifice $x^{a2}$ is brought in alinement with one of the orifices of the duct $a$, the part of the piston chamber 22, in the rear of the piston, is again connected with the exhaust port. This connection (momentarily interrupted by the turning of the valve) is thus restored simultaneously with the shifting of the orifices $c$ of the air duct, into alinement with the orifices of the duct $b$. In this position of the valve the space of the piston chamber in front of the piston is connected with the air inlet port, and the space in the rear of the piston with the exhaust port. These connections are maintained as long as the operator holds on to the handle operating the valve $24^a$. When the valve is released, it is returned automatically by the mechanism, described further on, to its normal position of rest. In this position the inflow of the driving fluid is cut off and both parts of the piston chamber are connected with the exhaust port.

By turning valve $24^a$ in an opposite direction, the orifice $x^{a\prime}$ of the valve duct is first shifted out of alinement with one of the orifices of the duct $a$ of the casing, whereby the connection with the exhaust port is temporarily interrupted; next the orifices $c$ of the air duct through the valve is moved in alinement with the orifices of the duct $a$ in the casing, whereby the part of the piston chamber in the rear of the piston 23 is connected with the inlet port of the cylinder. At the same time, the orifice $x^{b\prime}$ of the valve duct was brought temporarily in alinement with one of the orifices of the duct $b$ in the casing, and, the connection between the forward part of the piston chamber and the exhaust port having been completed thereby, the compressed air or other fluid, contained therein, was given opportunity to escape. This exhaust takes place before the connection of the inlet port of the cylinder with the duct $a$ into the piston chamber, in the rear of the piston, then, and at the same time when the part of the piston chamber in the rear of the piston is connected with the inlet port, the orifice $x^{b2}$ in the valve is brought in full alinement with the duct $b$ (from the part of the piston chamber in front of the piston) thereby again restoring the connection, temporarily interrupted by the turning of the valve, between the part of the piston chamber in front of the piston and the exhaust port. By the turning of the valve $24^a$ in the one or the other direction, the compressed air, or other driving fluid, is admitted into the air cylinder and drives the piston, alternately from one to the other end of the piston chamber, and moves whatever mechanism is, or may be, connected to the piston rod.

To prevent excessive turning of the valve $24^a$ and to secure the placing of the valve in proper position at every turn, that is the setting of the ports of the ducts in the valve in full alinement with the ports of the ducts $a$ and $b$ in the web 26 and also with the inlet port 25, an arc-shaped slot, or recess, 41 is provided in the valve $24^a$ (see Figs. 2 and 3) in the face adjoining the web 26 when the apparatus is assembled, and a pin $41^a$ is set in corresponding position in the web 26, to engage in the arc-shaped slot 41. The length of the slot 41 is calculated so that pin $41^a$ limits the motion of the valve, abutting against either end of the slot, when the valve is in the position in which the orifices or ports of the ducts in the valve register with the orifices or ports of the ducts in the casing, one of the branches $25^a$ or $25^b$ registers with the inlet port 25, according to which way the valve was turned, as explained above.

The "normal", or "rest position" of the valve $24^a$, that is, when both parts of the piston chamber are connected with the exhaust port, is midway between its two positions when the compressed air is being admitted to either part of the piston chamber. Therefore the valve $24^a$ must, unavoidably, pass through this, its "normal" position on every turn. Thus the described arrangement of the series of ducts in the valve effects, in addition, in coöperation with the arrangement of the ducts $a$ and $b$, and the location of the inlet port 25, that, during every turn of the valve, from one position to the other, both ducts $a$ and $b$ are connected with the exhaust port to permit the compressed air to escape from that part of the piston chamber, wherein it was admitted in the next preceding position of the valve, before any fresh charge is admitted to the other part. By combining, with these devices, of mechanism for automatically returning the valve 24 to its position of rest, when released, the explained arrangement of the ducts is also utilized to release, automatically, the expansive fluid, acting upon the piston, immediately upon the completing of its stroke. This mechanism is constructed and combined with the device as follows:

A socket 31, is cast on (or may be screwed to) the casing 21 of the air-cylinder and a bore 32 made therein on a line intersecting the axis of the stem $24^b$ of the valve, and at right angle therewith. The bottom end of the bore 32 is screw-threaded and a plug $32^a$ is screwed therein. The hollow stem of a T-shaped bracket 33 is fitted into the bore 32, and a coiled spring 34, longer than the stem, is inserted therein to rest upon the plug $32^a$. A two-armed rocking lever 35 is fixed on the stem $24^b$ of the valve, so adjusted that its arms $35^a$ and $35^b$ are in line with the cross-bar $33^a$ of the T-shaped bracket when set in the bore 32 of the socket. This lever 35 is preferably made integral with a ring or collar 36, which is snugly fitted upon the stem $24^b$, and a set screw 37 is set therein, whereby the ring 36 (and the lever 35) are fixed in place upon the stem. This construction is preferable because it admits more readily of such minute adjustment of the parts of this mechanism as required for the proper operation of the device. The surfaces of the arms $35^a$ and $35^b$ contacting with the cross-bar $33^a$ are appropriately curved to obtain a smooth co-action of the lever with the cross-bar $33^a$ and a more secure and more speedy setting of the valve.

When assembling this device the T-shaped bracket 33 is set in, into the bore 32 of the socket, the spring 34 being first inserted into its hollow stem, then the plug $32^a$ is screwed in just far enough to hold the parts in their places. Next the ring 36 is slid upon the stem $24^b$ of the valve and the plug $32^a$ is screwed in until the cross-bar $33^a$ contacts with both arms of lever 35. Then the valve $24^a$ is set in its "normal" position, that is the position in which the openings of the exhaust ducts $x^{a\prime}$ and $x^{b\prime}$ of the valve $24^a$ register with the termini of ducts $a$ and $b$ in the web 26, whereby both parts of the piston chamber are connected with the exhaust port. Then the ring 36 is fixed to the stem $24^b$ of the valve $24^a$ by the set screw 37. Finally the cross-bar $33^a$ is pressed harder against lever 35 by screwing in plug $32^a$ against the spring 34. It must, of course, be understood, that the pressure is regulated by the screwing in of the plug $32^a$ and that the spring 34 must not be excessively compressed. The adjustment must leave sufficient elasticity to the spring to permit it to be further compressed by the turning of the valve and to respond freely when the force turning the valve is released.

Lever 35 swings as the valve $24^a$ is turned, in either direction, and then one of its arms is thereby raised from, while the other (swinging in opposite direction) presses upon, the cross-bar $33^a$ of the bracket. This pressure drives the bracket in, into the socket 31 and thereby spring 34 is compressed. When the valve $24^a$ is released, the spring 34 re-acts, pushing the bracket 33 up, out of its socket. The cross-bar $33^a$ then presses against the arm of lever 35 by which the bracket was depressed and thereby causes the valve $24^a$ to turn, in a direction opposite to that in which it was turned by the operator, until the other arm of lever 35— the one which was raised from the cross-bar $33^a$ by the turning of the valve,—again comes in contact with it. When both arms of lever 35 contact with cross-bar $33^a$ the turning motion of valve $24^a$ is arrested, and the valve is then in the position described as its "normal" position, that is the position when the ducts from both parts of the piston chamber are connected with the exhaust port.

When the air cylinder is used in the position shown in Figs. 10 and 11, a shaft 37 is coupled to the end of stem 24ᵇ, of the valve 24ᵃ, and a handle or lever 39 is fixed to the end of the shaft. In the drawings the stem 24ᵃ of the valve is shown to be recessed and shaft 37 forked and flexibly connected thereto by cross-pin 38; the handle 39 is affixed to the other end of shaft 37 by a set screw. On two diametrically opposite points of the air cylinder casing 21 and approximately midway between its ends, bosses 45 are cast on and in these trunnions 45ᵃ are set. These trunnions serve for supporting the device in a bracket 46 whereby it is attached to the bed of the lathe or other machine, whereon the device is used. The air cylinder swings on trunnions 45ᵃ and thereby compensates for any deviation from its position by the operating movements of the parts. In the arrangement shown in Figs. 10 and 11 the air cylinder is set parallel to the spindle of the lathe and the stem 23ᵃ of the piston 23 is pivotally connected to lever 47 whereby the draw rod 48 of the chuck 49 is reciprocated. In the arrangement shown in Fig. 9 the stem 23ᵃ of piston 23 is coupled to the draw-rod 48 of the chuck; the air cylinder casing being similarly supported by trunnions 45ᵃ in the arms of a somewhat differently shaped bracket 46, whereby it is attached to the end of the lathe. These arrangements for attaching my improved device to a lathe or to other machine tools, belt shifters, clutches and the like must necessarily be changed as the conditions of the use of my improved device require. It needs probably no explaining that by merely withdrawing of plug 32ᵃ from the bore 32 the device is made to serve as well for all purposes where it is required to maintain the pressure of the driving fluid upon the piston after the completing of its stroke and that in such employment it yet obtains the advantage over such devices as were heretofore known, in that, owing to the described arrangements of the ducts in the casing, and in the valve, the exhaust port is always connected with the part of the piston chamber, into which the piston is being driven, simultaneously with the connecting of the inlet port with the other part of the piston chamber, and in that the exhaust port remains so connected with the part of the piston chamber, into which the piston is driven, as long as the inlet port is connected with the other part of the piston chamber. Consequently, no part of the force of the driving fluid is required to be expended upon compression or overcoming of the resistance of air or other fluid in that part of the piston chamber, into which the piston is driven. The entire force of the driving fluid is utilized on propelling the piston and there is no diminution of its stroke. That this advantage is always desirable and in many uses of such devices of great importance, will be readily agreed to by all familiar with the art.

I claim as my invention:

1. A device for operating chucks, clutches, belt shifters and the like, by an expansive fluid, the device comprising a casing, a piston chamber in the casing, a piston fitted into the chamber, and means for operatively connecting the piston with a chuck, clutch, belt shifter and the like; a duct into the piston chamber in front of the piston and another duct into the piston chamber in the rear of the piston; a valve and ducts in the valve, arranged to connect with either or both ducts into the piston chamber and controlling the admission into, and the exhaust from, the piston chamber of the expansive fluid; means for operating the valve, and means for automatically setting the valve after each stroke of the piston to connect the ducts in the valve with both ducts into the piston chamber whereby the expansive fluid is exhausted from the piston chamber.

2. A device for operating chucks, clutches, belt shifters and the like, by an expansive fluid, the device comprising a casing, an inlet port into, and an exhaust port from, the casing; a piston chamber in the casing, a piston fitted into the piston chamber and means for operatively connecting the piston with a chuck, clutch, belt shifter and the like; a duct into the piston chamber in front of the piston and another duct into the piston chamber in the rear of the piston; a valve; a set of ducts in the valve, arranged to connect with either of the two ducts into the piston chamber at a time, or simultaneously with both; means for operating the valve and means for automatically setting the valve, on the completing of each stroke of the piston, into a position in which the ducts in the valve connect with both ducts into the piston chamber.

3. A device for operating chucks, clutches, belt shifters and the like, by an expansive fluid, the device comprising a casing, a piston chamber and a valve chamber in the casing, a piston fitted into the piston chamber and a valve fitted into the valve chamber; two ducts from the valve chamber into the piston chamber, one into the part in front of the piston and the other into the part in the rear of the piston; two sets of ducts in the valve, one arranged to register alternately with one of the two ducts from the valve chamber into the piston chamber, and the other arranged to register either with one of the two ducts from the valve chamber into the piston chamber at a time, or simultaneously with both, means for operatively connecting the piston with a chuck, clutch, belt shifter and the like, and means for operating the valve.

4. A device for operating chucks, clutches, belt shifters and the like, by an expansive fluid, the device comprising a casing, a piston chamber and a valve chamber in the casing, a piston fitted into the piston chamber and a valve fitted into the valve chamber; two ducts from the valve chamber into the piston chamber, one into the part in front of the piston and the other into the part in the rear of the piston; two sets of ducts in the valve, one arranged to register alternately with one of the two ducts from the valve chamber into the piston chamber, and the other arranged to register either with one of the two ducts from the valve chamber into the piston chamber at a time, or simultaneously with both, means for operatively connecting the piston with a chuck, clutch, belt shifter and the like, means for operating the valve and means for automatically setting the valve, on the completing of each stroke of the piston, into a position, in which the one set of the ducts in the valve registers with both ducts from the valve chamber into the piston chamber.

5. A device for operating chucks, clutches, belt shifters and the like, by an expansive fluid, the device comprising a casing, a piston chamber and a valve chamber in the casing, an inlet port into the valve chamber, a piston fitted into the piston chamber; and a valve fitted into the valve chamber; two ducts from the valve chamber into the piston chamber, one into the part in front of the piston and the other into the part in the rear of the piston; two sets of ducts in the valve, one arranged to register alternately with one of the two ducts from the valve chamber into the piston chamber, and simultaneously with the inlet port into the valve chamber, and the other set, having connecting branches arranged to register alternately with either of the two ducts from the valve chamber into the piston chamber at a time, or simultaneously with both, and terminating in an exhaust port; means for operatively connecting the piston with a chuck, clutch, belt shifter and the like, and means for operating the valve.

6. A device for operating chucks, clutches, belt shifters and the like, by an expansive fluid, the device comprising a casing, a piston chamber and a valve chamber in the casing, an inlet port into the valve chamber, a piston fitted into the piston chamber; and a valve fitted into the valve chamber; two ducts from the valve chamber into the piston chamber, one into the part in front of the piston and the other into the part in the rear of the piston; two sets of ducts in the valve, one arranged to register alternately with one of the two ducts from the valve chamber into the piston chamber, and simultaneously with the inlet port into the valve chamber, and the other set, terminating in an exhaust port and having connecting branches arranged to register either with one of the two ducts, from the valve chamber into the piston chamber, at a time, or simultaneously with both; means for operatively connecting the piston with a chuck, clutch, belt shifter and the like, means for operating the valve and means for automatically setting the valve, on the completing of each stroke of the piston, into a position, in which the branches of the duct in the valve, terminating in an exhaust port, register with both ducts from the valve chamber into the piston chamber.

7. A device for operating chucks, clutches, belt shifters and the like, by an expansive fluid, the device comprising a casing, a piston chamber and a valve chamber in the casing; a web separating the piston chamber from the valve chamber, a piston fitted into the piston chamber; an inlet port into the valve chamber and an exhaust port therefrom; a duct from the valve chamber into the piston chamber in front of the piston and another duct from the valve chamber into the piston chamber in the rear of the piston; a valve fitted into the valve chamber, two sets of ducts in the valve, one set adapted to register alternately with one of the two ducts from the valve chamber into the piston chamber, and to connect simultaneously with the inlet port into the valve chamber; the other set being arranged to register alternately with either duct from the valve chamber into the piston chamber, or simultaneously with both, and to connect the ducts, or either of them, with the exhaust port, means for operatively connecting the piston with a chuck, clutch, belt shifter and the like, and means for operating the valve.

8. A device for operating chucks, clutches, belt shifters and the like, by an expansive fluid, the device comprising a casing, a piston chamber and a valve chamber in the casing; a web separating the piston chamber from the valve chamber; a piston fitted into the piston chamber; an inlet port into the valve chamber and an exhaust port therefrom; a duct from the valve chamber into the piston chamber in front of the piston and another duct from the valve chamber into the piston chamber in the rear of the piston; a valve fitted into the valve chamber, two sets of ducts in the valve, one set adapted to register alternately with one of the two ducts from the valve chamber into the piston chamber, and to connect simultaneously with the inlet port into the valve chamber; the other set being arranged to register alternately with either duct from the valve chamber into the piston chamber or simultaneously with both, and to connect the ducts, or either of them, with the exhaust port; means for operatively connecting the piston with a chuck, clutch, belt shifter and the like; means for operating the valve and means for automatically setting the valve, on the completing of each stroke of the piston, into a position, wherein the set of ducts, connecting with the exhaust port, registers with both conduits from the valve chamber into the piston chamber.

9. A device for operating chucks, clutches, belt shifters and the like, by an expansive fluid, comprising the combination of a casing, a piston chamber in the casing, separate ducts into each end of the piston chamber; a valve controlling the admission into, and exhaust from, the casing; ducts in the valve arranged to connect with either, or with both, ducts into the piston chamber; means for operating the valve, and means for automatically setting the valve, after each operation, to connect the ducts in the valve with both ducts into the piston chamber.

10. A device for operating chucks, clutches, belt shifters and the like, by an expansive fluid, comprising the combination of a casing, an inlet port into, and an exhaust port from, the casing; a piston chamber and a valve seat in the casing; separate ducts from the valve seat into each end of the piston chamber; a valve in the valve seat; two sets of ducts in the valve, arranged to connect with either of the two ducts into the piston chamber at a time, or simultaneously with both; means for operating the valve and means for normally holding the valve in position, in which the ducts in the valve connect with both ducts into the piston chamber, and automatically returning it to that position on the completing of each operation.

11. A device for operating chucks, clutches, belt shifters and the like, by an expansive fluid, comprising the combination of a casing, a piston chamber and a valve chamber in the casing, a valve fitted into the valve chamber; two ducts from the valve chamber into the piston chamber, one into each end of the piston chamber; two sets of ducts in the valve, one arranged to register alternately with one of the two ducts from the valve chamber into the piston chamber, and the other arranged to register either with one of the two ducts from the valve chamber into the piston chamber at a time, or simultaneously with both, and means for operating the valve.

12. A device for operating chucks, clutches, belt shifters and the like, by an expansive fluid, comprising the combination of a casing, a piston chamber and a valve chamber in the casing, a valve fitted into the valve chamber; two ducts from the valve chamber into the piston chamber, one into each end of the piston chamber; two sets of ducts in the valve, one arranged to register alternately with one of the two ducts from the valve chamber into the piston chamber, and the other arranged to register either with one of the two ducts from the valve chamber into the piston chamber at a time, or simultaneously with both, means for operating the valve and means for automatically setting the valve, after each operation, into a position, in which the one set of the ducts in the valve registers with both ducts from the valve chamber into the piston chamber.

13. A device for operating chucks, clutches, belt shifters and the like, by an expansive fluid, comprising the combination of a casing, a piston chamber and a valve chamber in the casing, an inlet port into the valve chamber, and two ducts from the valve chamber into the piston chamber, one into each end of the piston chamber; a valve fitted into the valve chamber; two sets of ducts in the valve, one arranged to register alternately with one of the two ducts from the valve chamber into the piston chamber, and simultaneously with the inlet port into the valve chamber, and the other set arranged to register alternately with either of the two ducts from the valve chamber into the piston chamber at a time, or simultaneously with both, and terminating in an exhaust port, and means for operating the valve.

14. A device for operating chucks, clutches, belt shifters and the like, by an expansive fluid, comprising the combination of a casing, a piston chamber and a valve chamber in the casing, an inlet port into the valve chamber, and two ducts from the valve chamber into the piston chamber, one into each end of the piston chamber; a valve fitted into the valve chamber; a set of ducts in the valve, arranged to register alternately with one of the two ducts from the valve chamber into the piston chamber and simultaneously with the inlet port into the valve chamber, and another set, terminating in an exhaust port and having connecting branches, arranged to register one with either one of the two ducts from the valve chamber into the piston chamber at a time, or both branches simultaneously with both; means for operating the valve and means for automatically setting the valve, after each operation, into a position, in which the branches of the duct in the valve, terminating in an exhaust port, register with both ducts from the valve chamber into the piston chamber.

15. A device for operating chucks, clutches, belt shifters and the like, by an expansive fluid, comprising the combination of a casing, a piston chamber and a valve chamber in the casing; a web separating the piston chamber from the valve chamber, an inlet port into the valve chamber and an exhaust port therefrom; ducts from the valve chamber into each end of the piston chamber; a valve fitted into the valve chamber, two sets of ducts in the valve, one set adapted to register alternately with one of the two ducts from the valve chamber into the piston chamber, and to connect simultaneously with the inlet port into the valve chamber; the other set being arranged to register alternately with either duct from the valve chamber into the piston chamber, or simultaneously with both, connecting the ducts, or either of them, with the exhaust port, and means for operating the valve.

16. A device for operating chucks, clutches, belt shifters and the like, by an expansive fluid, comprising the combination of a casing, a piston chamber and a valve chamber in the casing; a web, separating the piston chamber from the valve chamber; an inlet port into the valve chamber and an exhaust port therefrom; two ducts from the valve chamber, one into each end of the piston chamber; a valve fitted into the valve chamber, two sets of ducts in the valve, one set adapted to register alternately with one of the two ducts from the valve chamber into the piston chamber, and to connect simultaneously with the inlet port into the valve chamber and the other set being arranged to register alternately with either duct from the valve chamber into the piston chamber or simultaneously with both, and to connect the ducts, or either of them, with the exhaust port; means for operating the valve and means for automatically setting the valve, after each operation, into a position, wherein the set of ducts, connecting with the exhaust port, registers with both ducts from the valve chamber into the piston chamber.

WALTER L. ABATE.

Witnesses:
LEON R. JACOBS,
M. A. HELMKE.